(12) United States Patent
Corman et al.

(10) Patent No.: US 6,503,441 B2
(45) Date of Patent: Jan. 7, 2003

(54) METHOD FOR PRODUCING MELT-INFILTRATED CERAMIC COMPOSITES USING FORMED SUPPORTS

(75) Inventors: Gregory Scot Corman, Ballston Lake, NY (US); Milivoj Konstantin Brun, Ballston Lake, NY (US); Henry Charles McGuigan, Duanesburg, NY (US)

(73) Assignee: General Electric Company, Niskayuna, NY (US)

( * ) Notice: Subject to any disclaimer, the term of this patent is extended or adjusted under 35 U.S.C. 154(b) by 56 days.

(21) Appl. No.: 09/681,735

(22) Filed: May 30, 2001

(65) Prior Publication Data

US 2002/0180120 A1 Dec. 5, 2002

(51) Int. Cl.⁷ ............................................. C04B 35/65
(52) U.S. Cl. ................. 264/635; 264/632; 264/640; 264/642; 264/643; 264/29.1; 264/29.7; 264/682; 427/228
(58) Field of Search ............... 264/632, 635, 264/640, 642, 643, 29.1, 29.7, 682; 427/228

(56) References Cited

U.S. PATENT DOCUMENTS

| | | | |
|---|---|---|---|
| 4,120,731 A | 10/1978 | Hillig et al. | |
| 4,141,948 A | 2/1979 | Laskow et al. | |
| 4,148,894 A | 4/1979 | Hillig et al. | |
| 4,220,455 A | 9/1980 | St. Pierre et al. | |
| 4,238,433 A | 12/1980 | Hillig et al. | |
| 4,240,835 A | 12/1980 | Laskow et al. | |
| 4,242,106 A | 12/1980 | Morelock | |
| 4,247,304 A | 1/1981 | Morelock | |
| 4,353,953 A | 10/1982 | Morelock | |
| 4,626,516 A | 12/1986 | Morelock | |
| 4,889,686 A | 12/1989 | Singh et al. | |
| 4,944,904 A | 7/1990 | Singh et al. | |
| 5,205,970 A * | 4/1993 | Brun et al. | |
| 5,296,311 A | 3/1994 | McMurtry et al. | |
| 5,840,221 A | 11/1998 | Lau et al. | |
| 5,985,186 A * | 11/1999 | Kasprzyk et al. | 264/29.7 |
| 6,110,527 A | 8/2000 | Brun et al. | |
| 6,280,550 B1 * | 8/2001 | Steibel | 156/182 |

* cited by examiner

Primary Examiner—James Derrington
(74) Attorney, Agent, or Firm—Toan P. Vo; Noreen C. Johnson

(57) ABSTRACT

A method for producing shaped articles of ceramic composites provides a high degree of dimensional tolerance to these articles. A fiber preform is disposed on a surface of a stable formed support, a surface of which is formed with a plurality of indentations, such as grooves, slots, or channels. Precursors of ceramic matrix materials are provided to the fiber preform to infiltrate from both sides of the fiber preform. The infiltration is conducted under vacuum at a temperature not much greater than a melting point of the precursors. The melt-infiltrated composite article substantially retains its dimension and shape throughout the fabrication process.

29 Claims, 2 Drawing Sheets

METHOD FOR PRODUCING MELT-INFILTRATED CERAMIC COMPOSITES USING FORMED SUPPORTS

Federal Research Statement

This invention was first conceived or reduced to practice in the performance of work under contract DE-FC02-92CE41000 awarded by the United States Department of Energy. The United States of America may have certain rights to this invention.

BACKGROUND OF INVENTION

The present invention relates to a method for producing a ceramic composite. In particular, the present invention relates to melt-infiltrated ceramic composites and to a method for producing the same.

U.S. Pat. Nos. 4,120731; 4,141,948; 4,148,89; 4,220,455; 4,238,433; 4,240,835; 4,242,106; 4,247,304; 4,353,953; 4,626,516; 4,889,686; and 4,944,904; assigned to the assignee hereof and incorporated herein by reference, disclose molten silicon infiltration of materials which include carbon, molybdenum, carbon-coated diamond, cubic boron nitride, and blends of carbon with silicon carbide, boron nitride, silicon nitride, aluminum oxide, magnesium oxide and zirconium oxide.

Reinforced ceramic matrix composites ("CMCs") comprising micron-sized fibers having one composition, which fibers are dispersed in continuous ceramic matrices of the same or different composition, are well suited for structural applications because of their toughness, thermal resistance, high-temperature strength, and chemical stability. Such composites typically have high strength-to-weight ratio that renders them attractive in applications in which weight is a concern, such as in aeronautic applications. Their stability at high temperatures renders them very suitable in applications in which the components are in contact with a high-temperature gas, such as in gas turbine engine. For many of these components, such as a gas turbine shroud, the dimensional and shape tolerances that must be met by the composite components are very tight.

The production of CMCs typically begins with providing a fiber preform which is a porous shaped object made of micron-sized fibers with a protective coating, a portion of the matrix material supplied either as particulates from a ceramic precursor or by chemical vapor infiltration ("CVI"), and an amount of temporary binder. The fibers of the preform have typically been woven previously into a cloth or otherwise assembled into a structure. The porosity within the fiber preform is then filled with a matrix precursor material, often a molten metal such as silicon, that eventually produces the finished continuous ceramic matrix surrounding the fibers. SiC fibers have been used as a reinforcing material for ceramics such as SiC, TiC, $Si_3N_4$, or $Al_2O_3$. The filling of the fiber preform with the matrix precursor material and any attendant reaction between the matrix constituents already in the preform and the precursor material serve to densify the shaped object. This filling or densification may be achieved by chemical-vapor or liquid-phase infiltration by the matrix precursor material. Liquid-phase infiltration, often by a molten metal, is the preferred method because it is less time consuming and more often produces a fully dense body than the CVI process. Full densification is necessary to achieve good thermal and mechanical properties and, thus, a long-term performance of CMCs. However, liquid-phase infiltration also has shortcomings. First, it is usually conducted at a temperature only slightly above the melting point of the matrix precursor material and for as short a time as possible to prevent the undesired rapid deterioration of the fibers. This can result in nonuniform infiltration characterized by incompletely filled areas and, thus, an inferior product. Second, in order to ensure a more complete infiltration, a larger amount of metal infiltrant material than required is supplied on the surface of the preform with the result of having excess metal infiltrant remaining on the surface of the composite when the infiltration process is terminated. Although post-infiltration machining of this excess metal can be undertaken, it not only increases the fabrication cost but also can accidentally expose some of the fibers and provide points for environmental attack. Third, during the liquid-phase infiltration, especially with molten silicon, the shaped body typically passes through a relatively weak state (following burn-out of the temporary binder but before a complete infiltration and reaction of the matrix material) which can easily yield a distorted finished shape.

Therefore, it is very desirable to provide a liquid-phase infiltration process that can produce a shaped CMC article having uniform distribution of continuous matrix phase in a short time. It is also very desirable to provide a liquid-phase infiltration process that substantially preserves the dimensions of the article throughout the fabrication process and that does not require substantial further machining of the final densified article.

SUMMARY OF INVENTION

The present invention provides a method for producing shaped articles of melt-infiltrated ceramic composites, which method overcomes many shortcomings of the prior-art liquid-phase infiltration processes. The method of the present invention comprises the steps of: (1) providing a stable formed support; (2) disposing a fiber preform adjacent to the stable formed support; (3) providing at least a precursor of the ceramic matrix materials to the fiber preform; (4) heating the fiber preform with at least a precursor of the ceramic matrix materials still disposed on the stable formed support to a temperature greater than or equal to the melting point of the precursor of the ceramic matrix materials; (5) allowing the precursor in a molten state to infiltrate the fiber preform to result in a melt-infiltrated composite; and (6) cooling the melt-infiltrated composite to result in the shaped article of melt-infiltrated ceramic composite. The stable formed support may comprise a material that is not attacked by precursors of ceramic matrix materials at the infiltration temperature. Alternatively, the surface of the formed support may be coated with a material that protects the formed support from being attacked by precursors of ceramic matrix materials. As used herein, a "stable formed support" is one that remains a solid throughout the fabrication of the shaped articles and does not exhibit any creep or plastic deformation, and the dimension of which does not change by more than the dimensional tolerances required in the finished shaped CMC articles.

The surface of the stable formed support adjacent to the fiber preform is provided with a plurality of indentations that extend beyond at least one end of the fiber preform. In one aspect of the present invention, the indentations are grooves, slots, or channels formed into the surface of the stable formed support. These indentations may also be interconnected.

In another aspect of the invention, the stable formed support is a hollow structure having an outside cross-sectional dimension substantially equal to an inside cross-sectional dimension of the fiber preform. The stable formed support has a plurality of indentations formed on the surface adjacent to the fiber preform.

In still another aspect of the present invention, the stable formed support with the fiber preform and the precursor ceramic matrix material provided thereon is disposed within a heating device, and a vacuum is applied to the interior of heating device. The stable formed support with the fiber preform and the precursor ceramic matrix material provided thereon is heated to at least the melting point of the precursor of the ceramic matrix material so that it melts and flows along the fiber preform surface adjacent to the plurality of indentations, thereby infiltrating the fiber preform from both sides.

Other aspects, advantages, and salient features of the present invention will become apparent from a perusal of the following detailed description, which, when taken in conjunction with the accompanying figures, discloses embodiments of the present invention.

DETAILED DESCRIPTION

Figure 1:
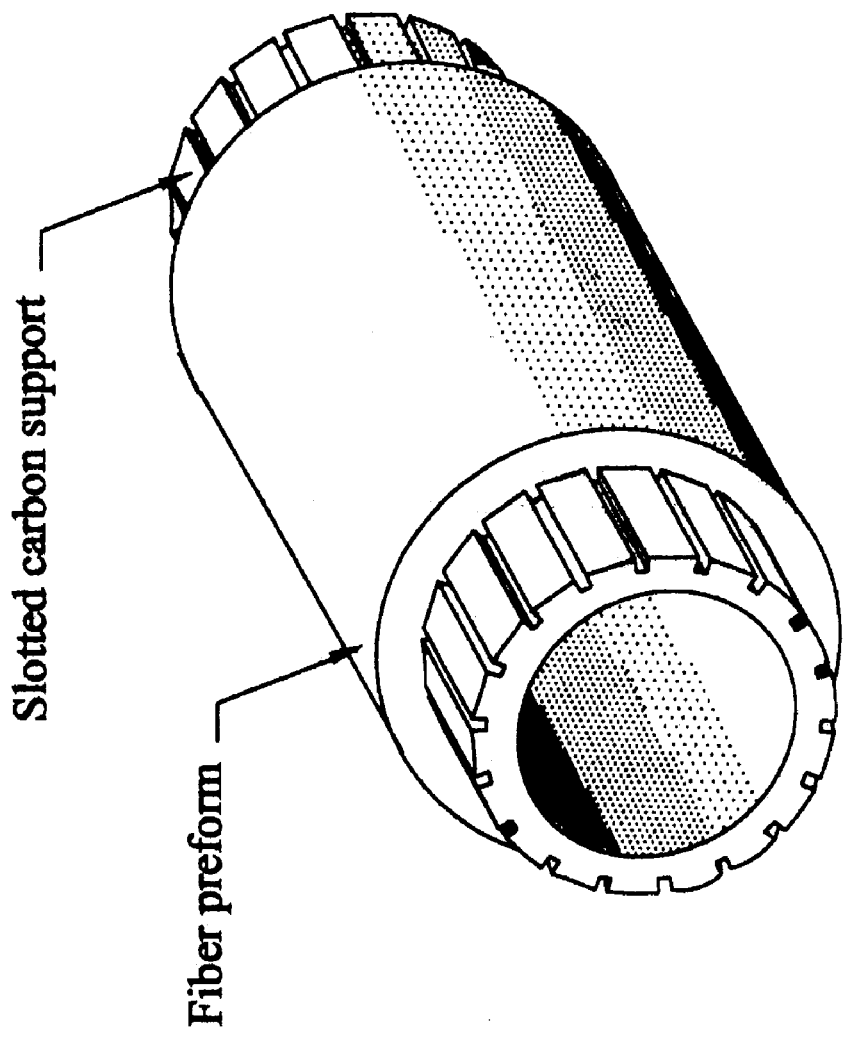
FIG. 1 shows an isometric view of a fiber preform on a slotted support.
Figure 2:
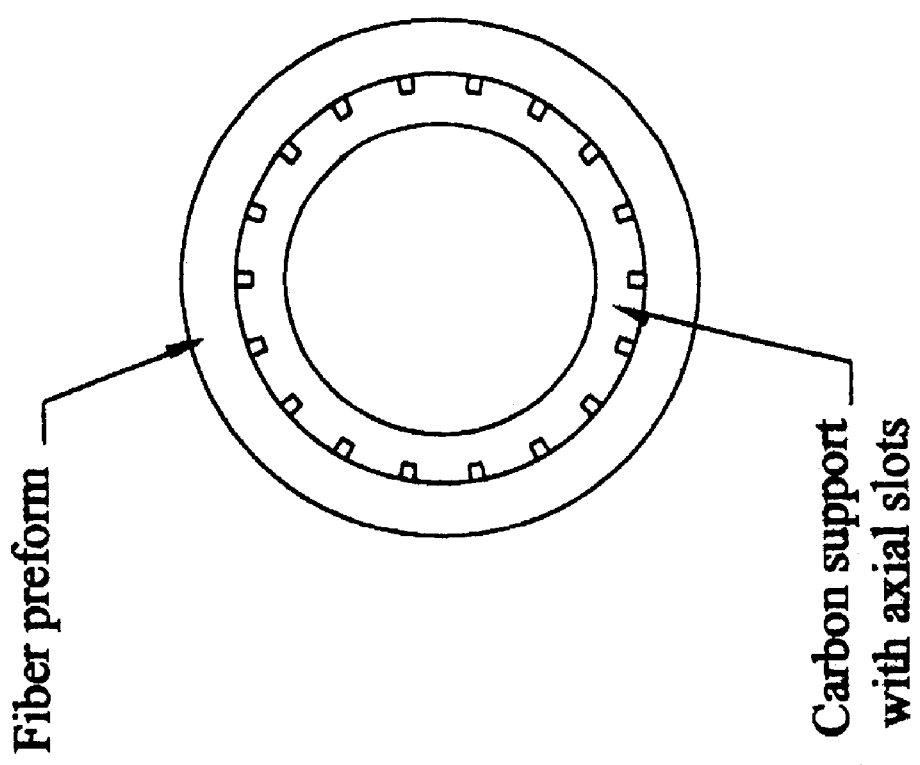
FIG. 2 is a cross section of the combination of FIG. 1.

As used herein, the terms "fiber" or "fibers" include fibers, filaments, whiskers, tows, cloth, mat or felt, and combinations thereof. Fibers suitable for used in the present invention are selected from the group consisting of elemental carbon, silicon carbide, silicon nitride, fibers made of inorganic oxide materials, and combinations thereof.

In one preferred embodiment, the fibers comprise silicon carbide. Reference herein to fibers of silicon carbide includes single-crystal or polycrystalline fibers, or wherein silicon carbide envelops a core of another material, such as carbon or tungsten. The fibers may also comprise organic precursors that will be transformed into silicon carbide at a temperature within the range of temperatures experienced during the fabrication process. Such fibers may also include elements other than silicon and carbon. Examples of known silicon carbide fibers are the Nicalon™ family of silicon carbide fibers available from Nippon Carbon, Japan; Sylramic™ silicon carbide fibers available from Dow Corning, Michigan; the Tyranno™ family of fibers available from UBE Industries, Japan; and fibers having the trade name SCS-6 or SCS-10 produced by Textron, Massachusetts.

The present invention provides a method for producing shaped articles of melt-infiltrated ceramic composites. The method of the present invention comprises the steps of: (1) providing a stable formed support; (2) disposing a fiber preform adjacent to the stable formed support; (3) providing at least a precursor of the ceramic matrix materials to the fiber preform; (4) heating the fiber preform with at least a precursor of the ceramic matrix materials still disposed on the stable formed support to a temperature greater than or equal to the melting point of the precursor of the ceramic matrix materials; (5) allowing the precursor in a molten state to infiltrate the fiber preform to result in a melt-infiltrated composite; and (6) cooling the melt-infiltrated composite to result in the shaped article of melt-infiltrated ceramic composite. The stable formed support may comprise boron nitride or other ceramic materials that are stable at the infiltration temperature, are not reactive with the matrix precursor materials, and have a thermal expansion close to those of the composite preform and the finished CMC article. Alternatively, the stable formed support may comprise a formed carbon support, the surface of which is coated with boron nitride or other ceramic materials that protect the formed carbon support from being attacked by precursors of ceramic matrix materials. In a preferred embodiment, the formed support is made of carbon coated with boron nitride.

Ceramic composites articles can be formed which comprise a porous fiber preform comprising ceramic fibers and matrix material (together, a "fiber preform") and an infiltrate phase. Typically, the ceramic fibers form a network of reinforcement bodies for the composite and are surrounded by the matrix and the infiltrate phase. The ceramic fiber preform is porous because, while forming a network, the fibers together with any matrix material present therein are spaced apart, creating inter-fibrillar spaces or regions. These inter-fibrillar regions are filled with an infiltrate phase. Generally, the fibers range from about 0.3 micron to about 150 microns in diameter, and from about 10 microns to about 10 cm or longer in length. The fibers can be used as a continuous filament or as discontinuous fibers, which frequently have an aspect ratio of at least 10 and as high as 1000 or more. The shaped fiber preform may be made by a number of manners. Low aspect-ratio fibers may be mixed with a binder, such as an organic resin, a cellulosic material, or a combination thereof, and formed into a desired shape. In one aspect of the present invention, micron-sized particles of carbon or other appropriate materials are admixed with the fibers and the organic resin or cellulosic material to provide a source of a reactant for the formation of the ceramic matrix material.

The mixture can be formed or shaped into a preform or compact by a number of known techniques. For example, it can be extruded, injection molded, die-pressed, isostatically pressed, or slip cast to produce the preform of desired shape and size. Preferably, the preform is of the shape and size of the finished composite article. The present invention generally provides a method of producing the finished composite article having a shape and size that is substantially the same as the shape and size of the preform. Although the Applicants do not wish to be bound by any particular theory, it is believed that the present invention prevents the preform from being distorted during the infiltration of the matrix precursor material when it goes through a weak state before a complete conversion of the matrix precursor to the final ceramic matrix material.

Alternatively, the fiber is continuous and as long as desired. Continuous fibers can be filament-wound around the stable formed support to build the preform having desired shape and thickness. Continuous fibers may also be formed into sheets by placing long lengths of fibers next to and parallel to one another. Such sheets can consist of single or multiple layers of filaments. Continuous filaments can also be woven, braided, or otherwise arrayed into desired configurations. When fibers are continuous or very long, the term "aspect ratio" is no longer useful or appropriate. The fiber sheets may be disposed around the stable formed support to build up a fiber preform having desired shape and thickness. When the composite desirably has a continuous SiC matrix, an organic resin or carbon particles are introduced into the fiber tows before they are made into tapes and formed into shape. As used herein, the term "carbon particles" or "carbon particulates" includes, but is not limited to, particles, flakes, whiskers, or fibers of amorphous, single crystal, polycrystalline carbon, graphite, carbonized plant fibers, lamp black, finely divided coal, charcoal, and carbonized polymer fibers or felt such as rayon, polyacrylonitrile, and polyacetylene.

The preform has an open porosity ranging from about 20% by volume to about 90% by volume of the preform, and the particular amount of such open porosity depends largely on the particular composite desired. Frequently, the preform has an open porosity ranging from about 25% by volume to about 80% by volume, or from about 30% by volume to about 60% by volume, of the preform. By "open porosity of the preform," it is meant herein pores, voids, or channels that are open to the surface of the preform thereby making the interior surfaces accessible to the ambient atmosphere and the infiltrant. Preferably, the preform has no closed porosity. By "closed porosity, " it is meant herein closed pores or void; i.e., pores not open to the surface of the preform and, therefore, not in contact with the ambient atmosphere. Void or pore volume; i.e., both open and closed porosity, can be determined by standard physical and metallographic techniques.

Preferably, the pores in the preform are small, ranging from about 0.1 micron to about 5 microns, and are distributed uniformly throughout the preform, thereby enabling the production of a composite wherein the matrix phase is uniformly distributed through the composite.

The fibers may be advantageously coated with a compound that renders them unreactive toward one or more of the molten precursors of the ceramic matrix materials. In one aspect of the present invention, the fibers are SiC fibers coated with a metal nitride coating, such as boron nitride or silicon-doped boron nitride. The coating prevents a substantial degradation of the fibers when they must be exposed to the molten precursors of the ceramic matrix materials for an extended period of time. Other coatings may be applied to impart a superior debonding characteristic of the fibers in the final composite under severe stress conditions. The metal nitride coating can be deposited by methods well known in the art for depositing a continuous coating without damaging the fiber. Coating processes such as chemical vapor deposition or physical vapor deposition processes, such as sputtering, are suitable. Generally the chemical vapor deposition of metal nitride is carried out at temperatures ranging from about 900° C. to about 1800° C. in a partial vacuum with the particular processing conditions being known in the art or determinable empirically. The metal nitride coating is at least sufficiently thick to be continuous and free of significant porosity. Coating thickness can range from about 0.1 micron to about 5 microns, and typically it is about 1 micron for fibers of about 8 to 15 microns in diameter. The coating thickness should be sufficient to prevent reaction, or prevent significant reaction, between the fibers and the infiltrating precursors of the ceramic matrix materials under the particular processing conditions used. In the case of a composite of SiC fibers in a SiC matrix, the precursor of the ceramic matrix material is typically silicon. During the infiltration process, the metal nitride coating may or may not react with or dissolve in the molten silicon depending on the time and temperature; i.e., the metal nitride coating will survive better at lower temperatures and for shorter times of infiltration. Generally, silicon infiltration time increases with the size of the preform. Therefore, larger-sized preforms may require thicker nitride coatings. The present invention advantageously limits the required time of exposure of the fiber preform to molten silicon and still provides a substantially uniform composition of the ceramic composite article.

Optionally, the metal nitride-coated fibers can be coated with a second continuous coating selected from the group consisting of carbon, metals that react with silicon to form a silicide, metal carbide, metal suicide, metal nitride, and metal diboride, on the metal nitride coating. The metal carbide may be a carbide of silicon, tantalum, titanium, or tungsten. The metal suicide is a silicide of chromium, molybdenum, tantalum, titanium, tungsten, or zirconium. The metal nitride is a nitride of silicon, aluminum, titanium, zirconium, hafnium, niobium, tantalum, or boron. The metal diboride is a diboride of titanium, zirconium, halfnium, or aluminum.

The outer coating of the fibers can promote wetting to improve the infiltration by capillarity, provide a desirable debonding with the matrix, or reduce the reaction between the matrix and the fiber during high temperature service. Moreover, the fibers may also be coated with a material that renders them readily wettable by the molten precursor of the ceramic matrix material.

A plurality of indentations is formed into the surface of the stable formed support on which the fiber preform is to be disposed. This is typically the outer surface of the stable formed support. The indentations are preferably grooves, slots, or channels that extends beyond at least one end of the fiber preform. They also may be interconnected in a region covered by the fiber preform. The cross-section of the indentations may be of triangular, rectangular, or hemispherical shape and have a largest dimension such that sufficient support is still possible when the fiber preform is in its weakest state. Typically, the width of the indentation is in a range from about 0.51 mm to about 5 mm, preferably from about 1.5 mm to about 4 mm. The stable formed support can be a solid block having an outer dimension that is substantially equal to an inner dimension of the fiber preform such that the fiber preform fits tightly around the stable formed support. Alternatively, the stable formed support may be a hollow structure, such a cylinder, the outer surface of which has indentations as disclosed above.

The stable formed support preferably comprises or is coated with a material that is not attacked by a precursor of the ceramic matrix material at the highest temperature during the fabrication of the ceramic composite article. When the ceramic matrix material is SiC, the stable formed support is preferably made of or coated with boron nitride. Other coating materials, such as metal nitrides, may be chosen for a compatibility with other particular ceramic matrix precursors. The coating material may be applied on the formed support by chemical or physical vapor deposition processes, as disclosed above for the coating of fibers. The coating is preferably continuous. However, the coating need not be impervious because molten silicon does not wet boron nitride. In another embodiment of the present invention, the formed support is sprayed with a slurry containing boron nitride particles.

The fiber preform is disposed on the formed support. In one embodiment of the present invention, the fiber preform is a cylinder that fits around the stable formed support. A precursor of the ceramic matrix material is applied directly or indirectly to the surface of the fiber preform. When the ceramic composite comprises a SiC continuous phase, the precursor is silicon. For example, silicon powder may be applied directly on the surface of the fiber preform. Alternatively, molten silicon may be supplied to the surface of the fiber preform by a wicking action. The stable formed support and the fiber preform with a precursor of the ceramic matrix material provided thereon are heated to a temperature greater than or equal to the melting point of the precursor of the ceramic matrix material in a vacuum, for example in a closed furnace. Preferably, the furnace is evacuated before the heating begins to avoid the entrapment of pockets of gas within the fiber preform. A vacuum in a range from about 1 Pa to about 300 Pa is typically adequate. Preferably, the vacuum is in a range from about 2 Pa to about 150 Pa.

Preferably, the furnace used for the infiltration process is a carbon furnace; i.e., a furnace the interior of which is constructed essentially from elemental carbon.

Such a furnace reacts with any residual oxygen in the furnace atmosphere to produce CO or $CO_2$ that does not substantially react with the carbon support, the fiber preform, or the precursor of the ceramic matrix material. When a carbon furnace is not used, it is preferable to have a quantity of carbon disposed within the interior of the furnace so that it can react with any residual oxygen in the furnace atmosphere.

Infiltration is performed at greater than or equal to the melting point of the precursor of the ceramic matrix material. In the case of silicon, the infiltration temperature is in a range from about 1400° C. to about 1600° C., preferably from about 1415° C. to about 1500° C., more preferably from about 1425° C. to about 1450° C. Higher temperatures lower the viscosity of molten silicon and promotes a better diffusion of the molten silicon into the fiber preform, but they can unnecessarily accelerate a degradation of the fibers. Although the Applicants do no wish to be bound by any particular theory, it is believed that the present invention promotes a diffusion of a molten precursor of the ceramic matrix material from both outer and inner surfaces of the fiber preform and/or allows for the escape of any gaseous product of the infiltration process. Thus, the time required for a complete infiltration can be substantially reduced, and thereby, reducing the chance that the fibers may be damaged, and at the same time a more uniform infiltration results.

Ceramic composite articles such as combustion chamber liners, combination combustor liners and transition pieces, and shroud rings were made using the method of the present invention.

EXAMPLE 1

A cylindrical combustor liner having an inner diameter ("ID") of 27.94 cm and a length of 25.4 cm was made on a carbon mandrel (i.e., the formed carbon support) spray-coated with boron nitride. The carbon mandrel had an outer diameter ("OD") 0.5 mm smaller than the desired ID of the combustor liner. The carbon mandrel having axial slots that were 1.6 mm wide and spaced 1.27 cm apart was made of graphite (Graphite Engineering and Sales Company, Greenville, Mich.). The outer surface of the carbon mandrel was spray coated with a boron-nitride slurry (Combat BN type V, Carborundum Boron Nitride, Amherst, N.Y.) to build up a total coating thickness of approximately 0.3 mm.

The boron nitride-coated carbon mandrel was then wrapped with tape-cast sheet of the composite matrix, nominally 0.18 mm thick, to form the inner surface of the combustor liner preform. The tape-cast sheet contained 49% by weight ("wt %") SiC particulates, 21 wt % carbon particulates, and 30 wt % organic resin binders. The cylindrical composite preform was then laid up onto the mandrel by alternately direct winding of the hoop plies and hand laying up of previously prepared unidirectional tapes for the axial plies, resulting in a 0°—and—90° cross-ply fiber architecture in the composite cylinder. The preform was then wrapped with a peal ply, breather ply, and plastic stretch film, and placed in a drying oven at 120° C. for 24 hours in order to laminate the plies together and to cure the thermosetting resins in the matrix. The wrapped peal, breather, and stretch film were removed and the composite preform was then subjected to a binder burn-out treatment (heating in a vacuum furnace with a temperature ramp of 45° C./hour to 400 C., 60° C./hour to 550° C., 5° C./minute to 700° C. with a 30-minute hold and then cooling in the furnace to room temperature) while still on the mandrel. A mixture of Si, B, and BN powders was then applied to the outside surface of the composite preform as a slurry and dried.

The composite preform, still on the carbon mandrel and with the powder mixture packed on the outer surface, was then heated in a vacuum furnace, under a vacuum of about 27 Pa, to above 1420° C. to melt the silicon powder and allow for its infiltration into the composite preform. A time-temperature cycle of 1435° C. for 48 minutes was found to be sufficient to fully infiltrate such a composite preform when supported on a slotted mandrel. The melt-infiltrated composite was cooled down to approximately ambient temperature under the same vacuum. A similar combustor liner was infiltrated on an un-slotted mandrel at 1450° C. for 70 minutes and the infiltration was found to be only about 85% complete (i.e., approximately 15% of the composite preform volume had not been infiltrated with silicon). These results demonstrated that the slotted carbon mandrel (i.e., carbon support) allows for more complete infiltration in a shorter time and lower temperature than does an un-slotted mandrel. As a result, the composite combustor liner made on the slotted mandrel according to the present invention has better properties, such as mechanical, thermal, and chemical resistance. The spray coating of BN on the carbon mandrel was sufficiently protective of the carbon material that the carbon mandrel may be reused.

EXAMPLE 2

Several shroud rings of composite material of SiC fibers in SiC matrix having an ID of 46.61 cm were fabricated using the procedure of Example 1 and a slotted carbon mandrel. Shroud rings require a very tight tolerance on the ID dimension and the circularity. By fabricating the shroud rings on the carbon mandrel, the required tolerance of 0.5 mm was achieved, as measured by a coordinate measuring machine. In contrast, smaller shrouds made without a supporting mandrel showed out-of-roundness values of up to about 6 mm. These results indicated that dimensional tolerance was consistently achieved with the present invention.

While various embodiments are describe herein, it will be appreciated from the specification that various combinations of elements, variations, equivalents, or improvements therein may be made by those skilled in the art, and are still within the scope of the invention as defined in the appended claims.

What is claimed is:

1. A method for producing a shaped article of a ceramic composite, said composite comprising fibers dispersed in ceramic matrix materials, said method comprising the steps of:

providing a stable formed support having a plurality of indentations formed into a surface thereof;

disposing a fiber preform adjacent to said surface having said indentations of said stable formed support, said fiber preform comprising packed fibers;

providing at least one precursor of said ceramic matrix materials to said fiber preform;

heating said fiber preform with said at least one precursor on said stable formed support to a temperature greater than or equal to a melting point of said at least one precursor;

allowing said precursor in a molten state to infiltrate said fiber preform for an infiltration time sufficient to result in a melt-infiltrated composite; and cooling said melt-infiltrated composite to result in said shaped article of said ceramic composite.

2. The method for producing a shaped article of a ceramic composite according to claim 1, wherein said indentations have a form selected from the group consisting of grooves, slots, and channels.

3. The method for producing a shaped article of a ceramic composite according to claim 2, wherein said indentations have a cross-section of triangular, rectangular, or hemispherical form.

4. The method for producing a shaped article of a ceramic composite according to claim 2, wherein said indentations extend beyond at least an end of said fiber preform.

5. The method for producing a shaped article of a ceramic composite according to claim 4, wherein said indentations have a width in a range from about 0.5 mm to about 5 mm.

6. The method for producing a shaped article of a ceramic composite according to claim 5, wherein said width is in a range from about 1.5 mm to about 4 mm.

7. The method for producing a shaped article of a ceramic composite according to claim 4, wherein said stable formed support has an outer dimension substantially equal to an inner dimension of said shaped article of said ceramic composite.

8. The method for producing a shaped article of a ceramic composite according to claim 1, wherein said stable formed support comprises a shaped structure of a carbon material, a surface of said shaped structure being coated with a protective material that protects said shaped structure from being attacked by precursors of said ceramic matrix materials.

9. The method for producing a shaped article of a ceramic composite according to claim 1, wherein said stable formed support comprises a material that is stable at an infiltration temperature, is not substantially attacked by precursors of said ceramic matrix materials, a thermal expansion of said support matching closely with those of said fiber perform and said shaped article.

10. The method for producing a shaped article of a ceramic composite according to claim 1, wherein said stable formed support comprises boron nitride.

11. The method for producing a shaped article of a ceramic composite according to claim 8, wherein said protective material is a nitride.

12. The method for producing a shaped article of a ceramic composite according to claim 11, wherein said nitride is boron nitride.

13. The method for producing a shaped article of a ceramic composite according to claim 1, wherein said fibers comprise a material selected from the group consisting of carbon, silicon carbide, silicon nitride, inorganic oxide, and combinations thereof.

14. The method for producing a shaped article of a ceramic composite according to claim 13, wherein said fibers comprise silicon carbide fibers.

15. The method for producing a shaped article of a ceramic composite according to claim 14, wherein said silicon carbide fibers are coated with a material selected from the group consisting of nitrides, silicon-doped nitrides, carbides, silicides, diborides, and combinations thereof.

16. The method for producing a shaped article of a ceramic composite according to claim 15, wherein said material is boron nitride.

17. The method for producing a shaped article of a ceramic composite according to claim 1, wherein said ceramic matrix material comprises silicon carbide.

18. The method for producing a shaped article of a ceramic composite according to claim 1, wherein said at least one precursor of said ceramic matrix material comprises silicon.

19. The method for producing a shaped article of a ceramic composite according to claim 1, wherein said heating is conducted at a temperature in a range from about 1400° C. to about 1600° C.

20. The method for producing a shaped article of a ceramic composite according to claim 19, wherein said heating is conducted at a temperature in a range from about 1415° C. to about 1500° C.

21. The method for producing a shaped article of a ceramic composite according to claim 1, wherein said heating is ramped from ambient temperature to a melting point of said at least one precursor.

22. The method for producing a shaped article of a ceramic composite according to claim 1, wherein said heating is conducted under a vacuum from about 1 Pa to about 300 Pa.

23. The method for producing a shaped article of a ceramic composite according to claim 22, wherein said vacuum is in a range from about 2 Pa to about 150 Pa.

24. The method for producing a shaped article of a ceramic composite according to claim 1, wherein said infiltration time is in a range from about 5 minutes to about 2 hours.

25. The method for producing a shaped article of a ceramic composite according to claim 24, wherein said infiltration time is in a range from about 10 minutes to about 1 hour.

26. The method for producing a shaped article of a ceramic composite according to claim 1, wherein said cooling is conducted in a device used for said heating and under a vacuum.

27. The method for producing a shaped article of a ceramic composite according to claim 26, wherein said cooling continues until a temperature approximately equal to ambient temperature.

28. The method for producing a shaped article of a ceramic composite according to claim 20, wherein said heating is conducted at a temperature in a range from about 1425° C. to about 1450° C.

29. The method for producing a shaped article of a ceramic composite according to claim 25, wherein said infiltration time is in a range from about 20 minutes to about 1 hour.

* * * * *